US008910251B2

(12) United States Patent  
Shepard et al.

(10) Patent No.: US 8,910,251 B2
(45) Date of Patent: Dec. 9, 2014

(54) USING SOCIAL INFORMATION FOR AUTHENTICATING A USER SESSION (75) Inventors: Luke Jonathan Shepard, Palo Alto, CA (US); William Chen, Palo Alto, CA (US); Todd Perry, Palo Alto, CA (US); Lev Popov, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 691 days.

(21) Appl. No.: 12/399,723

(22) Filed: Mar. 6, 2009

(65) Prior Publication Data

US 2010/0229223 A1 Sep. 9, 2010

(51) Int. Cl.
  G06F 7/04 (2006.01)
  G06F 21/31 (2013.01)
  H04L 29/08 (2006.01)
  G06F 15/16 (2006.01)
  G06F 17/30 (2006.01)
  H04L 29/06 (2006.01)

(52) U.S. Cl.
  CPC .............. *H04L 63/083* (2013.01); *G06F 21/31* (2013.01); *H04L 67/02* (2013.01)
  USPC .......................... 726/5; 726/4; 726/7; 726/18

(58) Field of Classification Search
  USPC ...................................................... 726/5, 18
  See application file for complete search history.

(56) References Cited

U.S. PATENT DOCUMENTS

| | | | |
|---|---|---|---|
| 5,345,549 A | | 9/1994 | Appel et al. |
| 6,496,936 B1* | | 12/2002 | French et al. .................... 726/7 |
| 2007/0101010 A1* | | 5/2007 | Ellison et al. ................. 709/229 |
| 2008/0040475 A1* | | 2/2008 | Bosworth et al. ............. 709/224 |
| 2008/0046976 A1* | | 2/2008 | Zuckerberg ....................... 726/4 |
| 2008/0148366 A1 | | 6/2008 | Wahl |
| 2008/0189768 A1* | | 8/2008 | Callahan et al. ................... 726/4 |
| 2008/0270038 A1* | | 10/2008 | Partovi et al. .................. 702/19 |
| 2009/0012855 A1* | | 1/2009 | Jamal et al. ..................... 705/14 |

(Continued)

FOREIGN PATENT DOCUMENTS

| JP | 2002-197062 A | 0/7200 |
|---|---|---|
| JP | S 63-291153 A | 11/1988 |

(Continued)

OTHER PUBLICATIONS

Photo-Based Authentication Using Social Networks, Sarita Yardi2, Nick Feamster1, Amy Bruckman2 1School of Computer Science, 2School of Interactive Computing, Georgia Institute of Technology yardi,feamster,asb@cc.gatech.edu, WOSN'08, Aug. 18, 2008, Seattle, Washington, USA. Copyright 2008 ACM 978-1-60558-182 Aug. 8, 2008.*

(Continued)

*Primary Examiner* — Shin-Hon Chen
(74) *Attorney, Agent, or Firm* — Fenwick & West LLP (57) ABSTRACT

A social CAPTCHA is presented to authenticate a member of the social network. The social CAPTCHA includes one or more challenge questions based on information available in the social network, such as the user's activities and/or connections in the social network. The social information selected for the social CAPTCHA may be determined based on affinity scores associated with the member's connections, so that the challenge question relates to information that the user is more likely to be familiar with. A degree of difficulty of challenge questions may be determined and used for selecting the CAPTCHA based on a degree of suspicion.

38 Claims, 4 Drawing Sheets

(56) References Cited

U.S. PATENT DOCUMENTS

| | | | |
|---|---|---|---|
| 2009/0037983 A1 | 2/2009 | Chiruvolu et al. | |
| 2009/0249477 A1* | 10/2009 | Punera | 726/18 |
| 2009/0265770 A1* | 10/2009 | Basson et al. | 726/7 |
| 2009/0319271 A1* | 12/2009 | Gross | 704/246 |
| 2009/0320101 A1* | 12/2009 | Doyle et al. | 726/4 |
| 2009/0328163 A1* | 12/2009 | Preece | 726/5 |

FOREIGN PATENT DOCUMENTS

| | | |
|---|---|---|
| JP | 2002-229948 A | 8/2002 |
| JP | 2003-196566 A | 7/2003 |
| JP | 2003-216578 A | 7/2003 |
| JP | 2006-024057 A | 1/2006 |
| JP | 2006-164237 A | 6/2006 |

OTHER PUBLICATIONS

Photo-Based Authentication Using Social Networks Sarita Yardi, Nick Feamsterl, Amy Bruckman, School of Computer Science, School of Interactive Computing Georgia Institute of Technology.*

PCT International Search Report and Written Opinion, PCT Application No. PCT/US2010/025742, Apr. 14, 2010, eight pages.

Rabkin, A., "Personal Knowledge Questions for Fallback Authentication: Security Questions in the Era of Facebook," Symposium on Usable Privacy and Security (SOUPS) 2008, Jul. 23-25, 2008, Pittsburgh, PA, USA [Online] [Retrieved Mar. 29, 2010] Retrieved from the Internet <URL:http://cups.cs.cmu.edu/soups/2008/proceedings/p13Rabkin.pdf>.

European Patent Office, Supplementary European Search Report and Opinion, European Patent Application No. 10749151.6, May 24, 2013, nine pages.

Japanese Patent Office, Office Action, Japanese Patent Application No. P 2011-553004, Mar. 11, 2014, ten pages.

Yoichiro, T., Facebook vs. Open Social, *Java Traveler,* May 25, 2008, four pages, vol. 44.

Canadian Intellectual Property Office, Office Action, Canadian Patent Application No. 2,751,490, Aug. 29, 2013, two pages.

State Intellectual Property Office of the People's Republic of China, First Office Action, Chinese Patent Application No. 201080007785.5, Aug. 5, 2013, fifteen pages.

Canadian Intellectual Property Office, Office Action, Canadian Patent Applilcation No. 2,751,490, Jul. 30, 2014, four pages.

State Intellectual Property Office of the People's Republic of China, Second Office Action, Chinese Patent Application No. 201080007785.5, Apr. 30, 2014, fourteen pages.

* cited by examiner

USING SOCIAL INFORMATION FOR AUTHENTICATING A USER SESSION

FIELD OF THE INVENTION

This invention relates to computer security, and in particular to preventing an illegitimate use of a computing resource by an unauthorized person or by a computing algorithm.

BACKGROUND

The authenticity of a user interacting with the website may be determined in a number of ways, such as a challenge-response test that only the intended user is likely to be able to answer. This may prevent unauthorized use of a computing resource by another user or by an automated computing algorithm. One type of challenge question aimed at automated computing algorithms is called a CAPTCHA, which is an acronym for "Completely Automated Turing Test To Tell Computers and Humans Apart." A common type of CAPTCHA requires the user to type letters or numbers from a distorted image that is difficult for a computing algorithm to interpret but relatively easy for a human. Requiring a user to read distorted text for authentication prevents automatic systems from connecting to a website without user intervention. Other forms of CAPTCHAs may require the user to ask a common sense question, for example, "in the English alphabet, what letter comes after D." However, existing CAPTCHA mechanisms can be defeated by a practice known as "CAPTCHA farming," wherein an automated algorithm temporarily diverts the CAPTCHA question to a human user to solve the CAPTCHA question and then returns to its illegitimate purpose. If cheap human labor can be utilized, the existing CAPTCHA mechanisms can be rendered completely ineffective.

SUMMARY

To provide an improved security mechanism over existing CAPTCHAs, embodiments of the invention present a security question to a user based on information that only the user is likely to know. For example, in systems where information is known about a user's account, a security question may be tailored to the user using information from the user's account such that only the user is likely to be able to answer the question. This prevents CAPTCHA farming, since it defeats both automated algorithms and other humans who would not know the user's personal account information. In one embodiment, the user's account is with a social network, and the security question is based on information about the user's connections or interactions in the social network. For example, a social CAPTCHA may ask a member of a social network to identify an image of one of the member's connections (or friends) in the social network. As such, this security question can be referred to as a "social CAPTCHA."

In one embodiment, the social CAPTCHA can be used to authenticate a new session with the social network or with another system external to the social network. The session requesting interaction with the website is allowed to proceed if it provides correct answers for the social CAPTCHA; otherwise, it is denied. The system presenting the social CAPTCHA may itself be a social networking website, or it may be an external system that communicates with a social network to obtain the necessary information (e.g., the social CAPTCHA and the correct answer). In another embodiment, the member is presented with social CAPTCHA if the session is determined to be suspicious.

The difficulty level of the social CAPTCHA may be adjusted based on a degree of suspicion associated with the session. The difficulty level of a social CAPTCHA may be increased, for example, by increasing the number of questions asked in the social CAPTCHA or by increasing the number of potential answers from which to choose. Certain types of social CAPTCHAs may also be understood, empirically, to be more difficult than other types of questions. Increasing the difficulty of the social CAPTCHA generally increases the difficulty for unauthorized people, and not for the intended member.

In one embodiment of the invention, the system determines what information to use for the social CAPTCHA based on the user's affinity for the subject matter of the question. By basing the social CAPCTHA on information about the member's closer connections, the social CAPTCHA is easier for the intended user to answer but still difficult for other unauthorized people. The system may thus generate an affinity score between a member and each of the member's connections to determine which connections can be considered close friends or relations of the member. The social CAPTCHA may then be based on information about the member's connections that have at least a threshold level of affinity score. A high affinity score between a member and the member's connection implies frequent interactions between the two, thereby increasing the chances that the intended member is able to answer the social CAPTCHAs correctly, but generally not making the question easier for unauthorized people who are not the member.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A CAPTCHA based on recognition of distorted characters or common sense questions can be defeated by use of human labor. However a CAPTCHA based on questions that require knowledge that only a specific user is likely to possess cannot be defeated by using human labor. For example, questions requiring information associated with close friends of a user cannot be solved by an arbitrary human that is not an acquaintance of the user. A CAPTCHA based on information related to a social circle of a user as well as social interactions of a user is called a social CAPTCHA. These questions require information that can be available in a social network.

A social network offers its members the ability to communicate and interact with other members of the social network.

In use, members join the social network and then add connections to a number of other members to whom they desire to be connected. As used herein, the term "friend" refers to any other member to whom a member has formed a connection, association, or relationship via the social network. The term friend need not require that members actually be friends in real life, (which would generally be the case when one of the members is a business or other entity); it simply implies a connection in the social network. Some embodiments of social network allow various social activities. For example, a member can define a group or network of members that are involved in certain related activity. For example, a group may be a fan club for a particular band. Accordingly, member activities related to the group might include joining the group, viewing content related to the band, listening to songs, watching videos, and posting a message on the discussion board.

In one embodiment, the social CAPTCHA can be a question that asks a user about information contained in an electronic account about the user's interactions with other people or things in a social network. The information may be merely what someone's connections/friends are, for example, a social CAPTCHA question can ask the user to associate a connection's image with the connection's name. In another embodiment, a social CAPTCHA may be based on an action that the user has taken or another user has taken towards the user in the social network, for example, "In the past week, you have sent a message to which of the following people?" or "Which of the following people added you as a connection last week?" In one embodiment, a social CAPTCHA can be a question related to actions taken by a user associated with various social network entities, for example, a social group or a social forum. As an example, a social CAPTCHA can be "Which of the following social groups did you join last week?"

A social network may have the necessary information to generate a social CAPTCHA for a user. Hence the social network can present social CAPTCHA to members of the social network for authentication. In some embodiments, a system that is not affiliated with a social network but is connected to the social network can obtain the necessary information from the social network to present a social captcha. For example, social network information may be obtained by an external system by calling appropriate APIs (application programming interface) provided by the social network. In another embodiment, a third party system may act as a liaison between systems that use social CAPTCHA for authentication and a social network by obtaining information from a social network and generating appropriate social CAPTCHA for systems that use social CAPTCHA.

Figure 1:
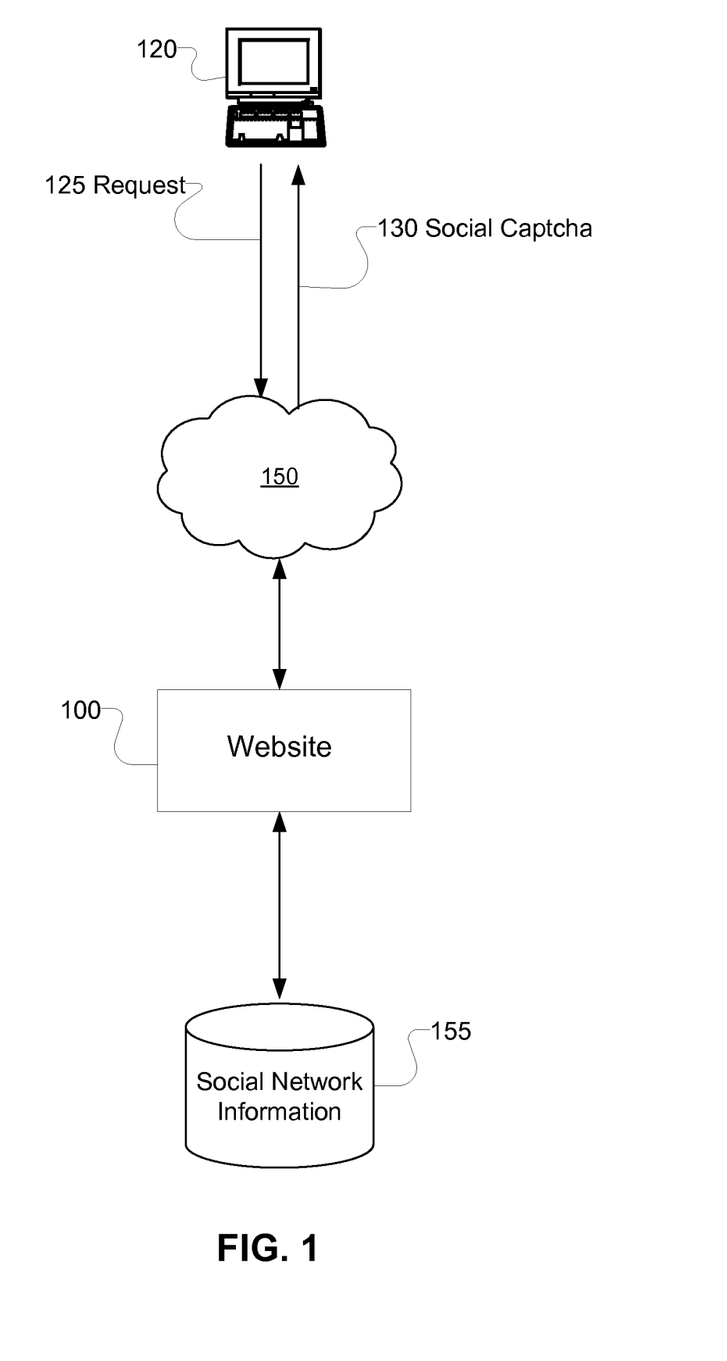
FIG. 1 is a diagram of a network system in which a user is presented with a social CAPTCHA in response to a request.

FIG. 1 illustrates how a client device interacting with a website may be presented with a CAPTCHA based on social information associated with a user, also referred to as a social CAPTCHA. The client device 120 sends a request 125 communicated over the network 150 to the website 100. The request 125 may be, for example, a request to login to a user account or an attempt to access or update information associated with the user. The website may determine based on various criteria whether to allow the request 125 to be processed or to require additional authentication before processing the request. A request for information that is considered public may be processed without any additional authentication whereas a request for updating information associated with the user may require additional authentication. If additional authentication is required, the website presents 130 the client device with a social CAPTCHA based on social network information 155. In an embodiment where the website 100 itself is a social network, the social network information 155 necessary for determining the social CAPTCHA may be available locally at the website. Alternatively, if the website 100 does not have the social network information necessary to determine a social CAPTCHA, the website may communicate with a social network to obtain the required information. Further processing of request 125 is determined based on the correctness of answers obtained from the user in response to the social CAPTCHAs.

System Architecture

Figure 2:
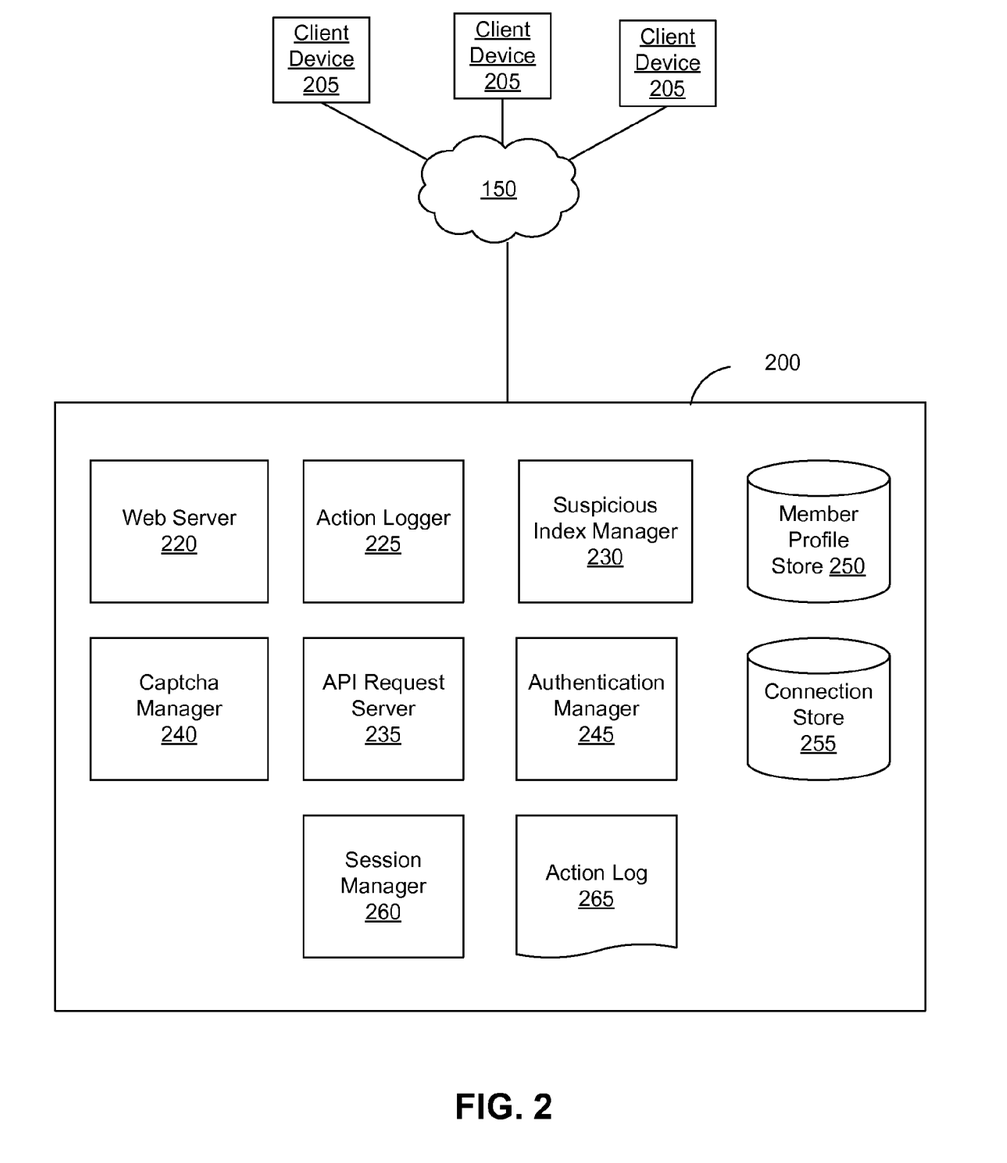
FIG. 2 is a diagram of a system architecture of a website configured to generate a social CAPTCHA, in accordance with an embodiment of the invention.

FIG. 2 is a high level block diagram illustrating a system environment for authenticating user sessions using social CAPTCHA. In this embodiment, the website 200 illustrated in FIG. 2 is a social networking website and hence locally stores the social network information necessary to determine the social CAPTCHA for a user session. The system environment comprises one or more client devices 205, a social networking website 200, and a network 150. In alternative configurations, different and/or additional modules can be included in the system.

The client devices 205 comprise one or more computing devices that can receive member input and transmit and receive data via the network 150. For example, the client devices 205 may be desktop computers, laptop computers, smart phones, personal digital assistants (PDAs), mobile phones, or any other device including computing functionality and data communication capabilities. The client devices 205 are configured to communicate via network 150, which may comprise any combination of local area and/or wide area networks, using both wired and wireless communication systems.

FIG. 2 contains a block diagram of the social networking website 200. The social networking website 200 includes a web server 220, action logger 225, a session manager 260, a suspicious index manager 230, an authentication manager 245, a CAPTCHA manager 240, a member profile store 250, a connection store 255, and an action log 265. In other embodiments, the social networking website 200 may include additional, fewer, or different modules for various applications. Conventional components such as network interfaces, security mechanisms, load balancers, failover servers, management and network operations consoles, and the like are not shown so as to not obscure the details of the system.

In some embodiments, the website 200 is not a social networking website but communicates with a social networking website to obtain the necessary social network information. The website 200 may communicate with the social networking website, for example, using APIs (Application Programming Interface) provided by a social networking website. In these embodiments, some modules shown in FIG. 2 may run in the website 200, whereas other modules may run in the social networking website. For example, the modules including the web server 220, action logger 225, suspicious index manager 230, CAPTCHA manager 260 can run in the website 200 but modules API request server 230, member profile store 250, connection store 255, and action log 265 may exist in a separate social networking website.

The social networking website 200 comprises a computing system that allows members to communicate or otherwise interact with each other and access content, as described herein. The social networking website 200 stores member profiles that describe the members of a social network, including biographic, demographic, and other types of descriptive information, such as work experience, educational history, hobbies or preferences, location, and the like. The member profiles are stored in the member profile store 250. The member profile may also store information provided by the member, for example, images. In certain embodiments, images of members may be tagged with the identification information of the appropriate members whose images are displayed.

The website 200 further stores data describing one or more connections between different members in the connection store 255. The connection information may indicate members who have similar or common work experience, group memberships, hobbies, or educational history. Additionally, the social network host site 200 includes member-defined connections between different members, allowing members to specify their relationships with other members. For example, these member defined connections allow members to generate relationships with other members that parallel the members' real-life relationships, such as friends, co-workers, partners, and so forth. Members may select from predefined types of connections, or define their own connection types as needed.

The web server 220 links the social networking website 200 via the network 150 to one or more client devices 205; the web server 220 serves web pages, as well as other web-related content, such as Java, Flash, XML, and so forth. The web server 220 may include a mail server or other messaging functionality for receiving and routing messages between the social networking website 200 and the client devices 150. The messages can be instant messages, queued messages (e.g., email), text and SMS (short message service) messages, or any other suitable messaging technique.

The action logger 225 is capable of receiving communications from the web server 220 about member actions on and/or off the social networking website 200. The action logger 225 populates the action log 265 with information about member actions to track them. Any action that a particular member takes with respect to another member is associated with each member's profile, through information maintained in a database or other data repository, such as the action log 265. Such actions may include, for example, adding a connection to the other member, sending a message to the other member, reading a message from the other member, viewing content associated with the other member, attending an event posted by another member, among others. In addition, a number of actions described below in connection with other objects are directed at particular members, so these actions are associated with those members as well. When a member takes an action on the social networking website 200, the action is recorded in an action log 265. In one embodiment, the website 200 maintains the action log 265 as a database of entries. When an action is taken on the website 200, the website 200 adds an entry for that action to the log 265.

The session manager 260 handles sessions created by the client device 205 during interactions with the social networking website 200. For example, a session is created when a member uses a client device 205 to log into the social networking website 200 or fetches web pages from the social networking website 200. The session manager 260 can analyze the information received from the client device 205 to identify information associated with the client device 205 based on communications with the client device 205, for example, the internet protocol (IP) address used by the client device for communicating with the social networking website 200 or machine cookies stored on the client device 205.

The suspicious index manager 230 obtains the information associated with a session created by the user and analyzes the information to determine if the probability that the session was created by the legitimate user of the account as compared to an illegitimate use by someone who stole the user's credentials. The suspicious index can be in the form of a numerical score assigned to a user session indicating the chances that the session is created by an illegitimate user or it can be a value from a predetermined set of values indicating the degree of suspicion associated with the session's authenticity, for example, low, medium, or high degree of suspicion. In another embodiment, the suspicious index can be a binary value indicating whether the user session is safe or not safe. In some embodiments, the suspiciousness manager may use session parameters to determine whether the session is suspicious. For example, a session created from a device known to have performed illegitimate activities in the past may be determined to be suspicious. Other embodiments may determine a session to be suspicious based on activities executed by the session. For example, a behavior indicative of spamming activity may be considered suspicious.

The authentication manager 245 obtains user credentials from a user creating a session and authenticates actions based on the session. For example, the login and password information is collected from a user and verified against information from the member profile store 350 before allowing the user access to information. Based on the degree of suspicion associated with a user session as determined by the suspicious index manager 230, the authentication manager may require different levels of authentication from a user before allowing access to the user based on the user session. For example, a low degree of suspicion associated with a session may result in authentication manager allowing access to information with simple authentication based on login and password. On the other hand a highly suspicious index associated with a session by the suspicious index manager may cause the authentication manager to require additional authentication based on social CAPTCHA.

The CAPTCHA manager 240 determines the CAPTCHAs necessary to authenticate a session. The CAPTCHA manager 240 may determine the number of questions used in the CAPTCHA, the difficulty level of the questions, and optionally for a question, a list of answers to choose from. The level of difficulty of the questions, the number of questions and the potential number of correct or incorrect answers may be determined by based on the suspicious index associated with a session as determined by the suspicious index manager 230. When a user provides answers to the CAPTCHAs, the CAPTCHA manager 240 determines the accuracy of the answers and informs the authentication manager 245. The authentication manager 245 uses the accuracy of the answers to the CAPTCHAs provided by the user to make decisions regarding authentication of the user session. Some embodiments tolerate incorrect answers to some questions, so long as the user provides correct answers at least a threshold number of questions correctly.

The API request server 235 allows external websites to access information from the social networking website by calling APIs. If the website interested in using a social CAPTCHA does not have the necessary social network information available locally, it can fetch the information from a social networking website. In this case, the website interested in the social network information may send an API request to the social networking website via the network 150. The API request is received at the social networking website by the API request server 235. The API request server 235 processes the request by determining the appropriate response, which is then communicated back to the requesting website via the network 150.

Using a Social CAPTCHA to Authenticate a User Session

Figure 3:
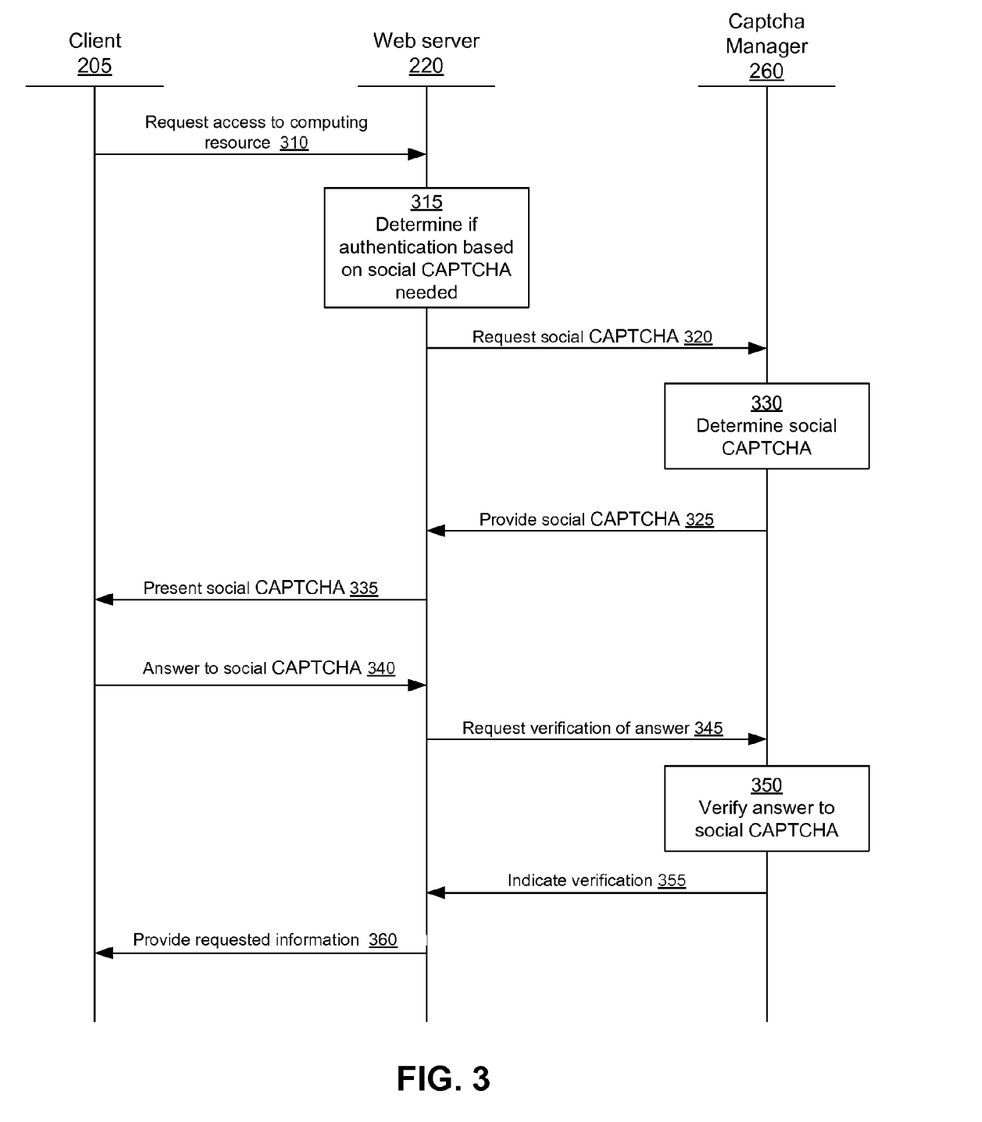
FIG. 3 is an interaction diagram of a process in which a client requesting information is presented with a social CAPTCHA, in accordance with one embodiment of the invention.

FIG. 3 shows a process in which a client requesting information for a user is presented with a social CAPTCHA, in accordance with one embodiment of the invention. In the embodiment illustrated in FIG. 3, a client 205 is interacting with a social networking website 200. The client 205 interacts 310 with the website 200 by sending a request for information associated with a user to the web server 220. Alternatively, the request may be for other kinds of information or may represent other kinds of interaction. For example, the request may comprise a request to login to the website or a request to execute an action on behalf of a user, such as broadcasting a message to multiple users or making a monetary transaction on behalf of the user, for example, an online purchase (both of which are actions that may be considered relatively suspicious). The request is associated with a member and identifies the member. For example, a login request may provide the login information for the member for identification purposes. The request may be part of a sequence of interactions based on a session that identified the member in previous interactions. Hence, the request may carry information identifying a session that has previously identified the member. The web server 220 determines 315 whether authentication based on CAPTCHA is required before allowing the request for information to be permitted or a requested action to be executed.

In certain embodiments, authentication using a social CAPTCHA may be required if the information requested is considered sensitive, for example, credit card information. Alternatively, authentication based on social CAPTCHA may be required if the action executed updates information related to the user, for example profile information. In some embodiments, suspicious activity from a session may require authentication based on social CAPTCHA. For example, an attempt to broadcast a message to a large number of users may be considered an indication of spamming. The web server 220 may interact with the suspicious index manager 230 to determine whether the session generating the request 310 is suspicious.

If a determination 315 is made that authentication based on social CAPTCHA is needed, the web server 220 requests 320 the CAPTCHA manager 260 to provide with appropriate CAPTCHA. The CAPTCHA manager 260 determines 330 the CAPTCHA based on social network information, for example, information available in the member profile store 250 or the connection store 255 or both. The CAPTCHA manager 260 may determine the number of questions and for a given question, the number of potential answers to choose from based on the suspiciousness of the session. The CAPTCHA manager 260 provides 325 the CAPTCHA to the web server 220. The web server 220 presents 335 the CAPTCHA to the client 205. If the client 205 provides 340 answers to the CAPTCHA questions, the web server sends 345 a request to the CAPTCHA manager to verify if the answers provided by the client 205 are correct. The CAPTCHA manager 260 verifies 350 the answers to the CAPTCHA and provides 355 the result of the verification to the web server 220. If the answers provided by the client 205 are verified to be correct, the web server 220 provides the client 205 with the requested information, or if the client 205 requested certain actions to be performed, the web server proceeds with execution of the requested actions. If the answers provided by the client 205 are verified to be incorrect, the web server may decide to deny the requested information or refuse to perform the requested action by client 205.

The questions used for a social CAPTCHA are determined based on various criteria, for example, whether an authentic user is likely to remember answers to the questions. For example, a member may have several connections and may not interact with all the connections on a regular basis. A member is unlikely to remember information related to connections that the member does not interact with frequently. On the other hand, if the member has recently interacted with a connection very frequently, the member should be able to answer questions associated with the connection. Also, if a member has marked a connection as a close relation, for example, spouse or other close family, the member is much more likely to remember information associated with the connection. For example, a member can be expected to remember the date of birth of the member's spouse.

In one embodiment, the system determines an affinity score for each connection of a member based on interactions between the member with the connections and information provided by the member related to the connection, for example, a family relationship. The interactions between the member and the connections may include a number of communications between the member and the connection using mechanisms provided by the social network. The interactions may also or alternatively include a number of interactions between the member and an object related to the member's connections, or an interaction between a member's connection and an object related to the member. The information related to interactions between members is available in the action log 270. Mechanisms of communication provided by a social network include, emails, communications using forums, invitations and the like. A member may interact with a connection by commenting on a photo posted by the connection. For example, two members may be considered close acquaintances if they appear in the same photo tagged with their identification information, since it is highly likely that they know each other. In certain embodiments, an image displaying a very large number of members tagged with their identification may not be considered indicative of all the members knowing each other, for example, a photo of a class that graduated together.

Two or more members may be assigned scores for each type of interaction based on the frequency of that particular type of interaction between the two members. An affinity score between two members is determined by computing a weighted sum of all scores based on interactions between them. In some embodiments only interactions between members that occurred in a recent time interval are considered for evaluating the affinity score. Hence, the affinity score may be recomputed periodically to reflect changes over time in scores based on interactions between members used to compute affinity score. Other factors may be used to determine the affinity score, for example, the type of relation between two members. Two members that are marked as married together in the social network may be assigned a high score based on their relation. Systems and methods for measuring user affinity in a social network environment are disclosed in U.S. application Ser. No. 11/503,093, filed Aug. 11, 2006, which is incorporated by reference in its entirety.

Social CAPTCHA used for authenticating a member is based on the member's connections that achieve an affinity score above a predetermined threshold. In some embodiments, the type of question is determined based on the affinity of score. For example, questions related to a connection with very high affinity may require more detailed information related to the connection compared to questions asked related to a connection with lower affinity score.

Questions in a social CAPTCHA may require a member to make decisions based on one or more images displayed to the member. For example, the member may be presented with an image of the member's connection and asked to identify the connection. In some embodiments, the member may be presented with identification information of some of the member's connection as potential answers to choose from. Alternatively, the member may be presented with identification information, for example, the first and last name of a connection and asked to identify the connection's image from a given choice of images. Another type of question, may present an image to the member in which the member has been tagged and the question requires the member to identify a connection that is also shown in the image and tagged with the connections identification. Social CAPTCHA questions may also be based on activities in the social network that a member is involved in. For example, a member that has frequently interacted with a connection on the forum may be asked to identify the connection that the member has been interacting with on the forum. Or a member that is an active member of a social group may be asked questions related to the social group, for example, given a list of social groups, identify a group that the member actively participates in.

In some embodiments, the severity of CAPTCHA questions may be determined based on suspiciousness of the session requesting information. As shown in the flowchart in FIG. 4, a session requests 400 access to a computing resource. The request may be, for example, a request to login using a member's account, a request for information associated with a member, or a request to execute certain action on behalf of a member. An action requested on behalf of a member includes an attempt to send emails, an attempt to execute a financial transaction on behalf of the user, or a request to update the profile information associated with the member.

Figure 4:
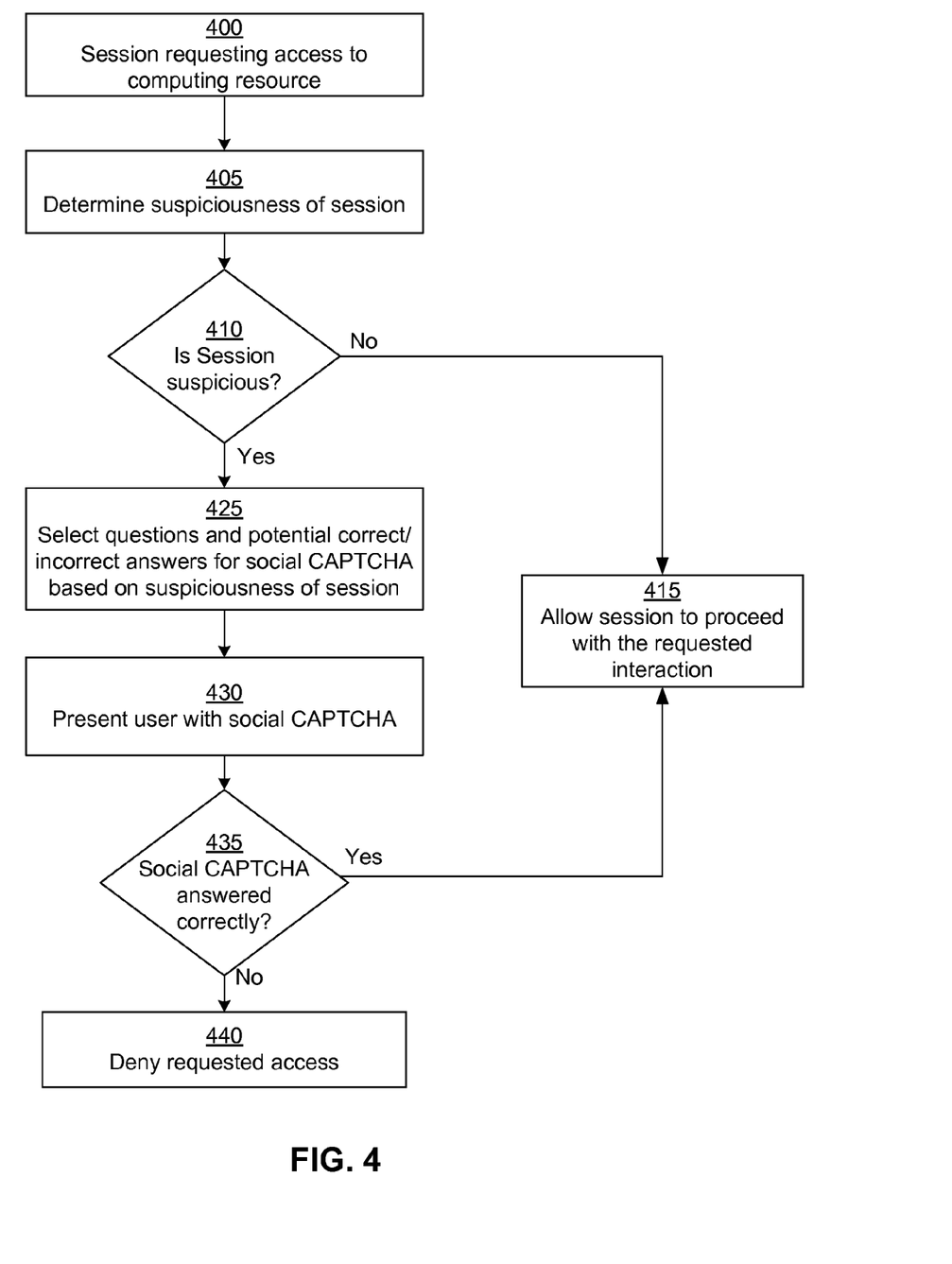
FIG. 4 is a flowchart of a process for using a social CAPTCHA to authenticate a session requesting information based on a determined suspiciousness of the session, in accordance with one embodiment of the invention.

The suspicious index manager 230 determines whether the session is suspicious or not. If a session is determined 410 to be not suspicious or in other words safe, the authentication manager 245 allows 415 the session to proceed with the requested interaction. On the other hand, if the session is determined to be suspicious, the authentication manager 245 may require additional authentication based on social CAPTCHA. If additional authentication based on social CAPTCHA is required, the CAPTCHA manager 240 selects 425 the CAPTCHA to be presented to the user. The difficulty level of the CAPTCHA is determined based on the degree of suspicion associated with the session. A highly suspicious session may be presented with a difficult CAPTCHA whereas a low suspicious session may be presented with an easy CAPTCHA. The difficulty level of a CAPTCHA may be increased, for example, by requiring the user to correctly answer more questions. Also, certain types of questions may be predetermined to be easy whereas some questions may be predetermined to be difficult. For example, a question based on member profile information may be considered easier than questions requiring information associated with the member's connections. A question may be presented along with potential correct and incorrect answers, requiring the user to select the correct answers. Making a selection from a large number of potential answers makes a question difficult as opposed to making a selection from a small number of potential answers.

Once the social CAPTCHA questions are determined, the user is presented 430 with the social CAPTCHA. If the user answers 435 the questions correctly, the session is allowed 415 to proceed with the requested interaction. If the user fails to answer 435 the social CAPTCHA questions correctly, the session's request for interaction is denied 440. Alternatively, if the user fails to answer 435 the social CAPTCHA, attempts can be made to authenticate the user via other mechanisms, for example, by asking the user to enter a code sent to the user's phone via a text message or by email. The alternative authentication mechanisms allow a legitimate user to authenticate if the user is unable to answer the social CAPTCHA questions for any reason.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
maintaining user profiles for a plurality of users of a social networking system;
maintaining a plurality of connections between the users of the social networking system;

receiving a request from a requestor for access to a computing resource, wherein the request is associated with a user of the social networking system;

selecting, for forming a challenge question, another user of the social networking system from a plurality of other users connected to the user via the social networking system, the selection based on a rate of interactions between the user and the other user;

obtaining information from a user profile of the other user;

determining whether the request is received from a suspicious source;

determining difficulty level of the challenge question based on whether the source is suspicious;

forming the challenge question according to the determined difficulty level, by a processor, wherein an answer to the challenge question comprises information obtained from the user profile of the other user;

sending the challenge question to the requestor; and responsive to receiving a correct answer to the challenge question, allowing the requested access.

2. The method of claim 1, wherein the request requires communicating with the social networking system using application programming interface provided by the social networking system.

3. The method of claim 1, further comprising:
sending to the requestor a plurality of answers for the challenge question comprising at least a correct answer and one or more incorrect answers.

4. The method of claim 3, further comprising:
determining the number of answers in the plurality of answers for the challenge question based on whether the source is suspicious or not.

5. The method of claim 1, wherein the other user is selected responsive to a recent interaction between the user and the other user.

6. The method of claim 1, wherein the request is a request to login to the user's account.

7. The method of claim 1, wherein the request is a request to broadcast a message.

8. The method of claim 1, wherein the request is a request to conduct an online purchase on behalf of the user.

9. The method of claim 1, further comprising:
responsive to receiving an incorrect answer to the challenge question, denying the requested access.

10. The method of claim 1, wherein an amount of detail for an answer to the challenge question is based on a measure of affinity between the user and the other user.

11. The method of claim 1, wherein the selection of the other user for forming a challenge question is based on a weighted aggregate value based on the interactions between the user and the other user.

12. The method of claim 1, further comprising:
selecting a type of information used to form the challenge question based on a measure of affinity between the user and the other user.

13. The method of claim 12, wherein selecting the type of information used to form the challenge question comprises selecting a first type of information if the measure of affinity exceeds a threshold value and selecting a second type of information if the measure of affinity is below the threshold value.

14. The method of claim 1, wherein the selection of the other user for forming a challenge question is based on a time of interaction between the user and the other user.

15. The method of claim 1, wherein the selection of the other user for forming a challenge question is based on an interaction between the other user and an object related to the user.

16. A computer implemented method comprising:
maintaining user profiles for a plurality of users of a social networking system;

maintaining a plurality of connections between the users of the social networking system;

receiving a request from a requestor for generating a challenge question based on information related to a user of the social networking system, wherein the requestor receives a request for access from the user;

selecting, for forming a challenge question, another user of the social networking system from a plurality of other users connected to the user via the social networking system, the selection based on a rate of on interactions between the user and the other user;

obtaining information from a user profile of the other user;

determining whether the request is received from a suspicious source;

determining difficulty level of the challenge question based on whether the source is suspicious;

forming the challenge question according to the determined difficulty level, by a processor, wherein an answer to the challenge question comprises information obtained from the user profile of the other user; and sending the challenge question to the requestor wherein the requestor allows a requested access to the user responsive to receiving a correct answer to the challenge question.

17. The method of claim 16, further comprising:
receiving a suspiciousness score value from the requestor; and determining the difficulty of the challenge question based on the suspiciousness score value.

18. The method of claim 16, further comprising:
sending to the requestor a plurality of answers for the challenge question comprising at least a correct answer and one or more incorrect answers.

19. The method of claim 18, further comprising:
receiving a suspiciousness score value from the requestor; and determining the number of answers in the plurality of answers based on the suspiciousness score value.

20. The method of claim 16, wherein the other user is selected responsive to a recent interaction between the user and the other user.

21. The method of claim 16, wherein the selection of the other user for forming a challenge question is based on a weighted aggregate value based on the interactions between the user and the other user.

22. The method of claim 16, further comprising:
selecting a type of information used to form the challenge question based on a measure of affinity between the user and the other user.

23. The method of claim 22, wherein selecting the type of information used to form the challenge question comprises selecting a first type of information if the measure of affinity exceeds a threshold value and selecting a second type of information if the measure of affinity is below the threshold value.

24. The method of claim 16, wherein the selection of the other user for forming a challenge question is based on a time of interaction between the user and the other user.

25. A non-transitory computer-readable storage medium storing computer-executable code comprising:

a member profile store configured to store user profiles for a plurality of users of a social networking system;

a connection store configured to store a plurality of connections between the users of the social networking system;

a web server module configured to:
receive a request from a requestor for access to a computing resource, wherein the request is associated with a user of the social networking system;

a CAPTCHA manager module configured to:
select, for forming a challenge question, another user of the social networking system from a plurality of other users connected to the user via the social networking system, the selection based on a rate of interactions between the user and the other user;
obtain information from a user profile of the other user;
determine whether the request is received from a suspicious source;
determine difficulty level of the challenge question based on whether the source is suspicious; and
form the challenge question according to the determined difficulty level, wherein an answer to the challenge question comprises information obtained from the user profile of the other user; and the web server module further configured to:
send the challenge question to the requestor; and
responsive to receiving a correct answer to the challenge question, allow the requested access.

26. The non-transitory computer readable storage medium of claim 25, wherein the selection of the other user for forming a challenge question is based on a weighted aggregate value based on the interactions between the user and the other user.

27. The non-transitory computer readable storage medium of claim 25, wherein the CAPTCHA manager module is further configured to:
select a type of information used to form the challenge question based on a measure of affinity between the user and the other user.

28. The non-transitory computer readable storage medium of claim 27, wherein selecting the type of information used to form the challenge question comprises selecting a first type of information if the measure of affinity exceeds a threshold value and selecting a second type of information if the measure of affinity is below the threshold value.

29. The non-transitory computer readable storage medium of claim 25, wherein the selection of the other user for forming a challenge question is based on a time of interaction between the user and the other user.

30. The non-transitory computer readable storage medium of claim 25, wherein sending the challenge question to the requestor comprises:
sending to the requestor a plurality of answers for the challenge question comprising at least a correct answer and one or more incorrect answers.

31. The non-transitory computer readable storage medium of claim 25, wherein the selection of the other user for forming a challenge question is based on a weighted aggregate value based on the interactions between the user and the other user.

32. The non-transitory computer readable storage medium of claim 25, wherein the other user is selected responsive to a recent interaction between the user and the other user.

33. The non-transitory computer readable storage medium of claim 25, wherein the CAPTCHA manager module is further configured to:
select a type of information used to form the challenge question based on a measure of affinity between the user and the other user.

34. The non-transitory computer readable storage medium of claim 33, wherein selecting the type of information used to form the challenge question comprises selecting a first type of information if the measure of affinity exceeds a threshold value and selecting a second type of information if the measure of affinity is below the threshold value.

35. The non-transitory computer readable storage medium of claim 25, wherein the selection of the other user for forming a challenge question is based on a time of interaction between the user and the other user.

36. The non-transitory computer readable storage medium of claim 25, wherein an amount of detail for an answer to the challenge question is based on a measure of affinity between the user and the other user.

37. The non-transitory computer readable storage medium of claim 25, wherein the request is a request to login to the user's account.

38. The non-transitory computer readable storage medium of claim 25, wherein the request is a request to conduct an online purchase on behalf of the user.

* * * * *